United States Patent [19]

Tsutsumi et al.

[11] Patent Number: 5,159,014
[45] Date of Patent: Oct. 27, 1992

[54] THERMOPLASTIC ELASTOMER COMPOSITION AND RUBBER PARTS OF REFRIGERATOR HAVING A LAYER COMPOSED OF THERMOPLASTIC ELASTOMER COMPOSITION

[75] Inventors: Fumio Tsutsumi; Akihiko Morikawa; Mamoru Hasegawa, all of Yokkaichi; Noboru Oshima, Suzuka, all of Japan

[73] Assignee: Japan Synthetic Rubber Co., Ltd., Tokyo, Japan

[21] Appl. No.: 409,293

[22] Filed: Sep. 19, 1989

[30] Foreign Application Priority Data

Sep. 20, 1988 [JP] Japan .............................. 63-233782

[51] Int. Cl.⁵ .............................................. C08L 77/00
[52] U.S. Cl. ...................................... 525/66; 525/179
[58] Field of Search ................................ 525/66, 179

[56] References Cited

U.S. PATENT DOCUMENTS 2,914,496  7/1959  Kelly .................................... 525/184
4,987,017  1/1991  Sato et al. ........................... 525/179

FOREIGN PATENT DOCUMENTS 57-070139  4/1982  Japan .
63-221182  9/1988  Japan .
63-238159  10/1988  Japan .
1518639    7/1978  United Kingdom .
1552352    9/1979  United Kingdom .

Primary Examiner—Ana L. Carrillo
Attorney, Agent, or Firm—Oblon, Spivak, McClelland, Maier & Neustadt

[57] ABSTRACT

A thermoplastic elastomer composition comprising (a) 20 to 70 parts by weight of a polyamide and (b) 80 to 30 parts by weight of a butyl rubber modified with a functional-group-containing compound having at least one group selected from a carboxyl group, an acid anhydride group and an epoxy group as the functional group, the total amount of the (a) and (b) components being 100 parts by weight. The thermoplastic elastomer composition is resistant to permeation of FREON gases containing hydrogen atom in their molecules and has excellent flexibility, low-temperature resistance and oil resistance.

10 Claims, 1 Drawing Sheet

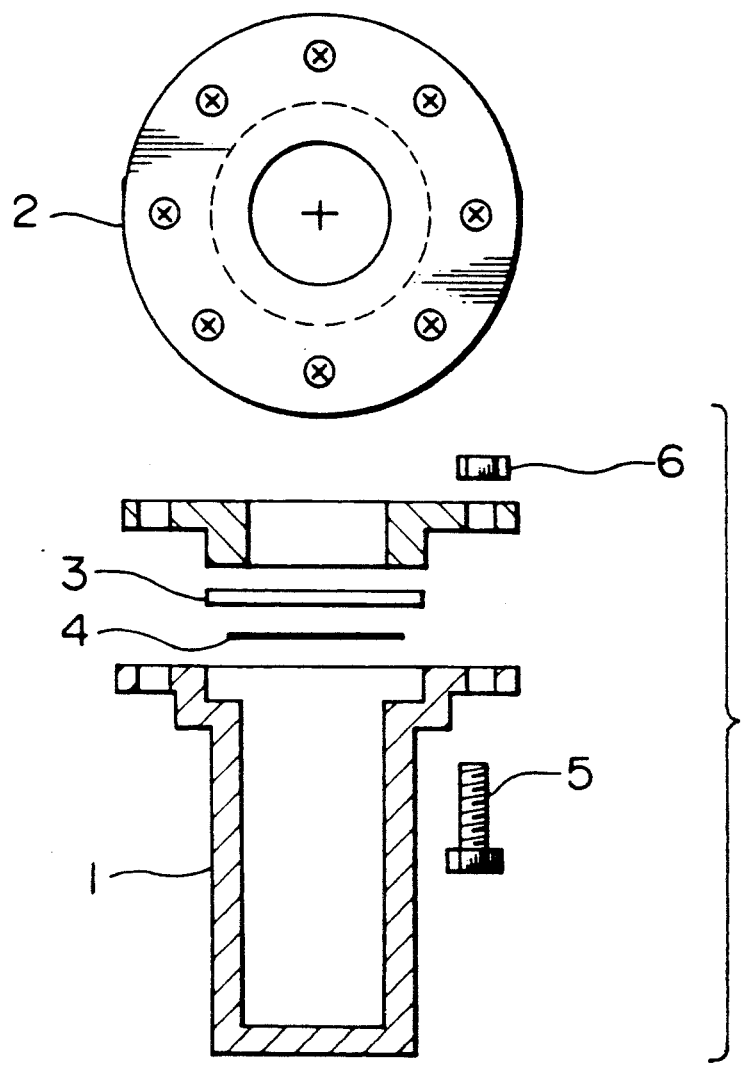

THERMOPLASTIC ELASTOMER COMPOSITION AND RUBBER PARTS OF REFRIGERATOR HAVING A LAYER COMPOSED OF THERMOPLASTIC ELASTOMER COMPOSITION

This invention relates to a thermoplastic elastomer composition which is rich in flexibility and excellent in balance of oil resistance, low-temperature resistance and resistance to permeation of FREON gases (fluorocarbons) and the like, and particularly to a thermoplastic elastomer composition suitable for use in rubber parts of a refrigerator.

As a refrigerant for air-conditioner in automobiles, FREON gases R-12($CCl_2F_2$), R-11($CCl_3F$) and R-113($CCl_2F$-$CCl_2F$) have heretofore been generally used. However, recently, it has been clarified that FREON gases R-12, R-11 and R-113 break the ozonosphere in the upper atmosphere and regulation of use of FREON gases R-12, R-11 and R-113 is being internationally strengthened.

As a countermeasure therefor, the change of the refrigerant from FREON gases R-12, R-11 and R-113 to $CF_4$ and easily decomposable FREON gases containing hydrogen atom in their molecules (hereinafter referred to as hydrogen-containing FREON gases) such as FREON gases R-22($CHClF_2$), R-142b($CH_3CClF_2$), R-134a($CF_3CH_2F$), R-123($CF_3CHCl_2$), R-152a($CH_3CHF_2$), R-141b($CH_3CCl_2f$), R-133a($CF_3CH_2Cl$), R-143a($CH_3CF_3$) and the like is in progress.

However, hydrogen-containing FREON gases such as FREON gases R-22, R-142b, R-134a and the like have a greater permeation ability to a material consisting of an elastomer than FREON gas R-12 and the like, and vulcanized rubbers comprising a nitrile rubber as a main component which have conventionally been used for FREON gas R-12 and the like are not satisfactory in ability to seal hydrogen-containing FREON gases R-22, R-142b, R-134a and the like.

Therefore, use of a metal tube for hydrogen-containing FREON gases such as FREON gases R-22, R-142b, R-134a and the like is taken into consideration; however, this has such problems that noise is made by vibration during the running of a car and the degree of freedom of piping layout in a bonnet is reduced.

Also, the use of resin hoses consisting essentially of nylon is under consideration; however, there are problems similar to those in the case of use of a metal tube. Therefore, there has been desired development of a rubber material for sealing FREON gases which has flexibility and excellent resistance to permeation of hydrogen-containing FREON gases such as FREON gases R-22, R-142b, R-143a and the like.

In addition, attempts have been made to blend a flexible elastomer with a resin such as nylon to obtain a balance of resistance to FREON gas-permeation and flexibility; however, when a satisfactory flexibility has been achieved the resistance to FREON gas-permeation has become insufficient and when satisfactory resistance to FREON gas-permeation has been achieved the flexibility has become insufficient. Thus, it has been difficult to satisfy the two properties simultaneously.

An object of this invention is to provide a thermoplastic elastomer composition having a flexibility and excellent resistance to permeation of FREON gases containing hydrogen atom in their molecules such as FREON gases R-22, R-142b, R-143a and the like.

Other objects and advantages of this invention will become apparent from the following description and the accompanying drawing.

BRIEF DESCRIPTION OF THE DRAWING

FIGS. 1A and 1B show a FREON gas-permeation tester as used in the examples, wherein 1 refers to a stainless steel cup, 2 to a stainless steel lid, 3 to a punching board having a permeation area of 1.16 $cm^2$, 4 to a test piece of 2 mm in thickness, and 5 to a bolt and 6 to a nut. FIG. 1A shows a frontal view of the stainless steel lid of the FREON gas-permeation tester and FIG. 1B shows an exploded side view of the FREON gas-permeation tester.

According to this invention, there is provided a thermoplastic elastomer composition which comprises (a) 20 to 70 parts by weight of a polyamide and (b) 80 to 30 parts by weight of a butyl rubber modified with a functional-group-containing compound having at least one group selected from a carboxyl group, an acid anhydride group and an epoxy group as the functional group (hereinafter referred to as the functional group-containing compound), the total amount of the (a) and (b) components being 100 parts by weight (the butyl rubber modified with the functional-group-containing compound is hereinafter referred to as merely the modified butyl rubber).

The polyamide (a) used in this invention includes nylon 6, nylon 6,6, nylon 11, nylon 12, nylon 6,9, nylon 6,10, nylon 4,6, nylon 6,12 and the like, among which nylon 11, nylon 12, nylon 6 and nylon 4,6 are preferable and nylon 11 and nylon 12 are more preferable.

The polyamide (a) may also be a polyamide obtained by copolymerizing different monomers, namely a polyamide elastomer synthesized by condensation of a polyether with a polyamide.

The modified butyl rubber (b) used in this invention is a butyl rubber having, as a modifying group, a carboxyl group, an acid anhydride group and/or an epoxy group. The modified butyl rubber may be prepared by (1) a method which comprises adding, to a butyl rubber or a halogenated butyl rubber, a functional-group-containing compound selected from an $\alpha,\beta$-ethylenically unsaturated carboxylic acid, an $\alpha,\beta$-ethylenically unsaturated carboxylic anhydride, an $\alpha,\beta$-ethylenically unsaturated carboxylic epoxide and an alkenyl glycidyl ether in the presence of a peroxide, (2) a method which comprises adding, to a butyl rubber, an alkali metal such as lithium, potassium, sodium or the like, and then adding thereto a functional group-containing compound selected from an $\alpha,\beta$-ethylenically unsaturated carboxylic acid, an $\alpha,\beta$-ethylenically unsaturated carboxylic anhydride, an $\alpha,\beta$-ethylenically unsaturated carboxylic epoxide and an alkenyl glycidyl ether or (3) a method which comprises dehydrohalogenating a halogenated butyl rubber with a dehydrohalogenating agent such as a metal which has been subjected to metal alcoholate-reduction, ZnO/RCOOH, $(RCOO)_2$-Zn/RCOOH/CaO in which R is an alkyl group having 1 to 8 carbon atoms, an aralkyl group or an aryl group (the same applies hereinafter), CuO, $(RCOO)_2$-Zn or the like to prepare a conjugated diene unit-containing butyl rubber and then adding thereto a functional-group-containing compound selected from an $\alpha,\beta$-ethylenically unsaturated carboxylic acid, an $\alpha,\beta$-ethylenically unsaturated carboxylic anhydride, an $\alpha,\beta$-ethylenically unsaturated carboxylic epoxide and an alkenyl glycidyl ether.

The modified butyl rubber (b) used in this invention is preferably prepared by the above method (3) in which the conjugated diene unit-containing butyl rubber is used.

The method of preparing the conjugated diene unit-containing butyl rubber is disclosed in U.S. Pat. No. 3,965,213, Japanese Patent Application Kokai Nos. 48-08385, 53-42289 and 59-84901, Japanese Patent Application Kokoku No. 57-14363 and the like.

The functional group-containing compound used for modification of a butyl rubber in the preparation of the modified butyl rubber (b) includes $\alpha,\beta$-ethylenically unsaturated carboxylic acids such as maleic acid, acrylic acid, methacrylic acid, itaconic acid, monoethyl maleate, fumaric acid, monoethyl fumarate, vinylbenzoic acid, vinylphthalic acid, monoethyl itaconate, maleic monoanilide and the like; $\alpha,\beta$-ethylenically unsaturated carboxylic anhydrides such as anhydrides of the above-mentioned ethylenically unsaturated carboxylic acids, for example, maleic anhydride and the like; $\alpha,\beta$-ethylenically unsaturated carboxylic epoxides such as glycidyl methacrylate, glycidyl acrylate, monoglycidyl itaconate, diglycidyl itaconate and the like; and alkenyl glycidyl ethers such as allyl glycidyl ether, vinyl glycidyl ether and the like.

In the preparation of the modified butyl rubber used in this invention, for example, the above-mentioned conjugated diene unit-containing butyl rubber is reacted with the functional-group-containing compound in the absence of a solvent or in the presence of an organic solvent such as n-hexane, toluene, cyclohexane, heptane, xylene or the like at a temperature of from room temperature to 300° C. In this reaction, a small amount of an organic peroxide such as benzoyl peroxide or the like may be used. This reaction may be conducted in a reactor provided with a stirring blade, a Banbury mixer, a kneader or the like.

The amount of the carboxyl group, acid anhydride group and/or epoxy group to be introduced into the butyl rubber is 1 to 50 milliequivalents, preferably 2 to 20 milliequivalents, per 100 g of the butyl rubber. When the amount of the functional group introduced is too small, the blendability of the modified butyl rubber (b) with the polyamide (a) becomes inferior and the composition obtained becomes inferior in resistance to permeation of hydrogen-containing FREON gases. When the amount is too high, the composition obtained becomes inferior in flexibility.

The thermoplastic elastomer composition of this invention comprises (a) a polyamide and (b) the modified butyl rubber as the essential components, and the weight ratio of the (a) component to the (b) component is 20/80–70/30, preferably 25/75–60/40, more preferably 30/70–55/45. When the amount of the modified butyl rubber (b) is more than 80 parts by weight, the composition obtained has too low strength to be used in rubber parts of a refrigerator and also is inferior in oil resistance and moldability. On the other hand, when the amount of the modified butyl rubber (b) is less than 30 parts by weight, it is impossible to obtain the desired flexibility.

The composition of this invention may comprise, in addition to (a) a polyamide and (b) the modified butyl rubber, not more than about 50 parts by weight, per 100 parts by weight of the modified butyl rubber, of chloroprene, chlorinated polyethylene, polyisoprene, natural rubber, an ethylene-propylene-diene copolymer rubber, styrene-butadiene copolymer rubber, polybutadiene rubber, chlorosulfonated polyethylene, an epichlorohydrin rubber, a halogenated ethylene-propylene rubber, ethylene-butene copolymer or the like.

The thermoplastic elastomer composition of this invention may further comprise a filler in a proportion of preferably 20–200 parts by weight, more preferably 30–180 parts by weight, per 100 parts by weight of the composition.

The filler mentioned above includes carbon black, silica, calcium carbonate and mica which have a surface area of 10 to 300 m$^2$/g (ASTM D3707) and a capability of absorbing dibutyl phthalate (DBP) in a proportion of 20–150 cc/100 g and further finely divided quartz, diatomaceous earth, zinc oxide, basic magnesium carbonate, calcium metasilicate, titanium dioxide, talc, aluminum sulfate, calcium sulfate, barium sulfate, asbestos, glass fiber, organic reinforcing agents, organic fillers and the like. Particularly, the above-mentioned carbon black, silica, calcium carbonate and mica are preferred. Also, in the case of an inorganic filler, a silane-coupling agent may be co-used to increase the modulus of crosslinked product.

These fillers may be used alone or in combination of two or more.

The thermoplastic elastomer composition of this invention may further comprise other various additives which are conventionally used. These additives may be added in the course of or after the preparation of the thermoplastic elastomer composition of this invention.

The thermoplastic elastomer composition may comprise, in any combination, a dispersing assistant such as a higher fatty acid, a metal salt or amine salt thereof: a plasticizer such as polydimethylsiloxane oil, diphenylsilanediol, trimethylsilanol, a phthalic acid derivative or an adipic acid derivative; a softening agent such as a lubricating oil, process oil, coal tar, castor oil or calcium stearate; an antioxidant such as a phenylenediamine, a phosphate, a quinoline, a cresol, a phenol or a metal dithiocarbamate; a heat-resisting agent such as iron oxide, cerium oxide, potassium hydroxide, iron naphthenate or potassium naphthenate; a coloring agent; an ultraviolet absorber; a flame-retardant; an oil-resistance-improver; an antiscorching agent; a tackifier; a lubricant and the like.

The thermoplastic elastomer composition of this invention can be prepared by melt-mixing (a) a polyamide and (b) the modified butyl rubber by means of an internal mixer such as roll, Banbury mixer, press-kneader or the like or a kneading machine such as extruder or the like.

In this case, it is possible to add a cross-linking agent for the modified butyl rubber such as a combination of an organic peroxide with a crosslinking assistant; a resin type crosslinking agent; quinonedioxide; nitrobenzene; tetrachloroquinone; a diamin; a combination of sulfur with a vulcanization accelerator and a vulcanizing assistant; or the like, melt-mix them to prepare a crosslinkable elastomer composition and thereafter subject the resulting mixture to molding and crosslinking under the conventional conditions to prepare a crosslinked product. Also, ultraviolet crosslinking is possible.

The organic peroxide includes, for example, dicumyl peroxide, 2,5-dimethyl-2,5-di(t-butylperoxy)hexine-3, 2,5-dimethyl-2,5-di(t-butylperoxy)hexane, 2,2'-bis(t-butylperoxy)-p-diisopropylbenzene, di-t-butyl peroxide, t-butylbenzoate, 1,1-bis(t-butylperoxy)-3,3,5-trimethylcyclohexane, 2,4-dichlorobenzoyl peroxide, benzoyl peroxide, p-chlorobenzoyl peroxide, t-butylperoxybenzoate, di-t-butylperoxyisophthalate and the like, and preferred is dicumyl peroxide.

In the crosslinking with the organic peroxide, a difunctional vinyl monomer may be used as a crosslinking assistant, and the crosslinking assistant includes ethylene dimethacrylate, 1,3-butylene dimethacrylate, 1,4-butylene dimethacrylate, 1,6-hexanediol dimethacrylate, polyethylene glycol dimethacrylate, 1,4-butanediol diacrylate, 1,6-hexanediol diacrylate, 2,2'-bis(4-methacryloyldiethoxyphenyl)propane, trimethylolpropane trimethacrylate, pentaerythritol triacrylate, divinylbenzene, N,N'-methylenebisacrylamide, p-quinonedioxime, p,p'-dibenzoylquinonedioxime, triazinedithiol, triallyl cyanurate, triallyl isocyanurate, m-phenylene bismaleimide, a silicone oil having a large vinyl content, and the like.

The resin type crosslinking agent includes alkylphenol-formaldehyde resins, brominated alkylphenol-formaldehyde resins and the like.

Also, an organic crosslinking agent such as quinonedioxime, nitrobenzene, tetrachloroquinone or the like may be used in some cases.

The diamine includes hexamethylenediamine, tetramethylenediamine, 3,3'-diphenylmethanediamine, 3,3'-dicyclohexylmethanediamine and the like.

In a blend system comprising sulfur, a vulcanizing accelerator and a vulcanizing assistant, the vulcanizing accelerator includes guanidines, thioureas, thiazoles, dithiocarbamates, xanthates and thiurams, and a mixing accelerator is also used.

The vulcanizing assistant, namely, a vulcanization-accelerating assistant or an activator, includes metal hydroxides such as zinc oxide, magnesium oxide and the like; a metal hydroxide such as calcium hydroxide or the like; fatty acids such as stearic acid, lauric acid, oleic acid and the like, and the vulcanization-accelerator is used in such an amount as used in conventional rubber blending.

The amount of the crosslinking agent or the crosslinking assistant blended is 0.01 to 10 parts by weight, preferably 0.05 to 5 parts by weight, per 100 parts by weight of the modified butyl rubber. When the amount is too small, the crosslinking density of the rubber component becomes low and the composition becomes inferior in mechanical strength and resistance to permeation of hydrogen-containing FREON gases. When the amount is too large, the crosslinking density of the rubber component becomes high and the elongation of the resulting composition becomes low.

The thermoplastic elastomer composition of this invention is excellent in resistance to permeation of hydrogen-containing FREON gases and, utilizing this characteristic feature, can be appropriately used in rubber parts of a refrigerator in which FREON gases, particularly hydrogen-containing FREON gases, are used, the rubber parts including, for example, a hose, a packing, a sealant and the like. For example, the hose and the packing may have a layer composed of the thermoplastic elastomer composition of this invention at a portion at which they contact with the refrigerant used in a refrigerator.

This invention is further explained in more detail below referring to Examples. In the Examples, various measurements were conducted according to the following methods.

Physical properties of crosslinked product: Evaluated according to JIS K6301.

Oil resistance: Measurement was effected at 100° C. for 70 hours according to JIS K6301 using a JIS No. 3 oil.

Low-temperature resistance: Evaluated by a Gehman torsion test.

FREON gas permeability: A rubber composition was kneaded with the compounding recipe shown in Table 1 or 2, and then vulcanized to prepare a disk-shaped sheet having a thickness of 2 mm and a diameter of 50 mm, after which the sheet was subjected to a FREON gas permeation test using a FREON gas permeation tester as shown in FIG. 1.

EXAMPLES 1-15 AND COMPARATIVE EXAMPLES 1-5

Preparation of Modified Butyl Rubber

Modified Butyl Rubber A

In a 3-liter flask, 100 g of chlorinated butyl rubber having a chlorine content of 1.2% by weight (JSR Butyl 1068, a trade name of Japan Synthetic Rubber, Co., Ltd.) was dissolved in 1,000 g of toluene in a nitrogen gas stream.

Subsequently, 3 g of zinc oxide and 2 g of 2-ethylhexanoic acid were added to the resulting solution, and thereafter, the resulting mixture was subjected to reaction for 2 hours under reflux conditions while removing water. The conjugated diene content of the resulting polymer was 1 mole. Incidentally, the conjugated diene content was determined by an ultraviolet ray-absorption analysis.

The conjugated diene unit-containing butyl rubber was mixed with maleic anhydride in a proportion of 0.5% by weight based on the weight of the polymer (5 milliequivalents/100 g of polymer) at 150° C. for 5 minutes in a 250-cc Brabender mixer to obtain a maleic anhydride-modified butyl rubber.

The amount of the maleic anhydride added to the polymer was 0.4% by weight.

Modified Butyl Rubber B

The same procedure as in the preparation of Modified Butyl Rubber A was repeated, except that the amount of maleic anhydride was varied to 2% by weight based on the weight of the polymer (20.4 milliequivalents/100 g of polymer), to obtain a maleic anhydride-modified butyl rubber.

The amount of the maleic anhydride added to the polymer was 1.5% by weight.

Modified Butyl Rubber C

The same procedure as in the preparation of Modified Butyl Rubber A was repeated, except that the amount of maleic anhydride was varied to 0.2% by weight based on the weight of the polymer (2 milliequivalents/100 g of polymer) to prepare a maleic anhydride modified butyl rubber.

The amount of the maleic anhydride added to the polymer was 0.2% by weight.

Modified Butyl Rubber D

The same procedure as in the preparation of Modified Butyl Rubber A was repeated, except that 2.0% by weight of methacrylic acid (23.3 milliequivalents/100 g of polymer) was substituted for the 0.5% by weight of maleic anhydride and the mixing was conducted at 150° C. for 20 minutes, to obtain an acrylic acid-modified butyl rubber.

The amount of the acrylic acid added to the polymer was 0.8% by weight.

Modified Butyl Rubber E

The same procedure as in the preparation of Modified Butyl Rubber A was repeated, except that 2.0% by weight of glycidyl methacrylate (14 milliequivalents/100 g of polymer) was substituted for the 0.5% by weight of maleic anhydride and the mixing was conducted at 150° C. for 20 minutes, to obtain a glycidyl methacrylate-modified butyl rubber.

The amount of the glycidyl methacrylate added to the polymer was 0.7% by weight

Modified Butyl Rubber F

To 100 parts by weight of a butyl rubber (JSR IIR 365, a trade name of Japan Synthetic Rubber Co., Ltd.) were added 0.5 part by weight of maleic anhydride and 0.3 part by weight of an organic peroxide (dicumyl peroxide), and the resulting mixture was subjected to mixing at 150° C. for 15 minutes to obtain a maleic anhydride-modified butyl rubber. The amount of the maleic anhydride added to the polymer was 0.3% by weight.

Preparation of Composition and Crosslinked Product (1) Nylon 11 (RILSAN BESNO, a trade name of TORAY INDUSTRIES, INC.) and nylon 12 (RILSAN AESNO, a trade name of TORAY INDUSTRIES, INC.) as polyamides and one of the Modified Butyl Rubbers A to E as the modified butyl rubber were melt-mixed with the compounding recipe 1 shown in Table 1 in an internal mixer (HAAKE RHEOCORD SYSTEM 40 RHEOMIX MIXER 3000 manufactured by Haake Buchler) at 200° C. for 10 minutes, and the resulting mixture was pressed at 200° C. for 10 minutes by an electrically heated press to prepare a sheet of 2 mm (thickness)×20 mm (width)×20 mm (length).

In Comparative Example 5, the compounding recipe 2 shown in Table 2 was used.

The sheets thus obtained were evaluated for physical properties.

The results obtained are shown in Table 3.

TABLE 1

Compounding recipe 1 (parts by weight)

| Sample No. | Nylon 11 | Nylon 12 | Modified butyl rubber | Carbon black N339 | Methylene-bis-cyclo-hexyl-amine | Dicumyl peroxide | Magnesium oxide |
|---|---|---|---|---|---|---|---|
| 1 | 50 | — | A (50) | — | 2 | — | — |
| 2 | 70 | — | A (30) | — | 2 | — | — |
| 3 | 40 | — | A (60) | — | 2 | — | — |
| 4 | — | 50 | A (50) | — | 2 | — | — |
| 5 | 50 | — | A (50) | 10 | 2 | — | — |
| 6 | 50 | — | A (50) | — | — | 0.5 | — |
| 7 | 50 | — | B (50) | — | 2 | — | — |
| 8 | 50 | — | C (50) | — | 2 | — | — |
| 9 | 50 | — | D (50) | — | 2 | — | — |
| 10 | 50 | — | E (50) | — | 2 | — | — |
| 11 | 50 | — | F (50) | — | 2 | — | — |
| 12 | 50 | — | A (50) | — | — | — | 5 |
| 13 | 50 | — | A (50) | — | — | — | — |
| 14 | 50 | — | JSR Butyl 1068 (50) | — | 2 | — | 5 |
| 15 | 15 | — | A (85) | — | 2 | — | — |
| 16 | 80 | — | A (20) | — | 2 | — | — |
| 17 | 100 | — | — | — | — | — | — |

TABLE 2

| Compounding receipt 2 | |
|---|---|
| NBR (JSR N222L, a trade name of Japan Synthetic Rubber Co., Ltd.) | 100 parts by weight |
| MT black | 50 parts by weight |
| SRF black | 80 parts by weight |
| Zinc oxide (ZnO) | 5 parts by weight |
| Stearic acid | 1 parts by weight |
| Polyester-based plasticizer*[1] | 2 parts by weight |
| Antioxidant*[2] | 0.5 parts by weight |
| Sulfur | 1.0 parts by weight |
| Vulcanizing accelerator*[3] | 0.4 parts by weight |
| NOCCELER TT (tetramethylthiuram disulfide) | |
| NOCCELER CZ (N-cyclohexyl-2-benzothiazyl sulfenamide) | 0.5 parts by weight |

Note:
*[1]RS 107, a trade name of Adeka Argus Chemical Co., Ltd.
*[2]NOCRAC 810NA, a trade name of Ohuchishinko Kagaku Kogyo K.K. for N-phenyl-N'-isopropyl-p-phenylene diamine.
*[3]Products of Ohuchishinko Kagaku Kogyo K.K. Vulcanization: Press-vulcanized at 150° C. for 20 minutes.

TABLE 2

| | Sample No. | 100% Modulus ($M_{100}$) (kg/cm$^2$) | Tensile strength ($T_B$) (kg/cm$^2$) | Elongation ($E_B$) (%) | Hardness ($H_S$) | Resistance $\Delta V$ (%) | Low temp. resistance $T_5/T_{10}$ (°C.) | FREON gas permeability (Kind of FREON gas) (mg · mm/ cm$^2$ · day) |
|---|---|---|---|---|---|---|---|---|
| Example | | | | | | | | |
| 1 | 1 | 210 | 350 | 270 | 99 | 8.0 | <−70/<−70 | 12 (R22) |
| 2 | 2 | 240 | 360 | 250 | 100 | 7.0 | −70/<−70 | 8 (R22) |
| 3 | 3 | 170 | 220 | 220 | 95 | 11.0 | −55/<−70 | 15 (R22) |
| 4 | 4 | 205 | 330 | 240 | 98 | 8.0 | −67/<−70 | 14 (R22) |
| 5 | 5 | 250 | 300 | 240 | 99 | 6.0 | −67/<−70 | 9 (R22) |
| 6 | 6 | 220 | 290 | 220 | 99 | 7.5 | −67/<−70 | 13 (R22) |
| 7 | 7 | 280 | 360 | 270 | 99 | 6.0 | −68/<−70 | 8 (R22) |
| 8 | 8 | 160 | 210 | 220 | 98 | 12.0 | <−70/<−70 | 16 (R22) |
| 9 | 9 | 155 | 205 | 180 | 99 | 13.0 | <−70/<−70 | 25 (R22) |
| 10 | 10 | 152 | 195 | 185 | 98 | 15.0 | <−70/<−70 | 27 (R22) |
| 11 | 11 | 165 | 200 | 190 | 99 | 13.0 | <−70/<−70 | 20 (R22) |
| 12 | 12 | 210 | 300 | 220 | 99 | 10.0 | <−70/<−70 | 12 (R22) |
| 13 | 13 | — | — | — | — | — | — | 3 (R134a) |
| 14 | 14 | — | — | — | — | — | — | 5 (R142b/R22 = 50/50) |
| 15 | 15 | 171 | 230 | 220 | 99 | 13.0 | <−70/<−70 | 20 (R22) |
| Comp. Example | | | | | | | | |
| 1 | 14 | 154 | 193 | 160 | 99 | 11.0 | <−70/<−70 | 42 (R22) |
| 2 | 15 | 25 | 80 | 120 | 87 | 21.0 | −47/−57 | 85 (R22) |

TABLE 2-continued

| Sample No. | 100% Modulus ($M_{100}$) (kg/cm$^2$) | Tensile strength ($T_B$) (kg/cm$^2$) | Elongation ($E_B$) (%) | Hardness ($H_S$) | Resistance $\Delta V$ (%) | Low temp. resistance $T_5/T_{10}$ (°C.) | FREON gas permeability (Kind of FREON gas) (mg · mm/ cm$^2$ · day) |
|---|---|---|---|---|---|---|---|
| 3 | 16 | 270 | 390 | 320 | 100 | 4.5 | Unmeasurable | 8 (R22) |
| 4 | 17 | 350 | 420 | 350 | 100 | 3.1 | Unmeasurable | 7 (R22) |
| 5 | NBR | 73 | 185 | 350 | 85 | 8.0 | −10/<−14 | 12 (R12) |

Examples 1 to 15 are superior in resistance to permeation of hydrogen-containing FREON gases to the compositions in Comparative Examples 1 and 2, and have a good balance of low-temperature resistance and tensile characteristics.

In Comparative Examples 3 and 4, the composition are rich in nylon and consists of nylon alone, respectively, and hence, are inferior in low-temperature resistance and not suitable for use in vibration parts. Comparative Example 5 is for showing the FREON gas-permeability of a nitrile rubber (acrylonitrile-butadiene rubber, NBR) composition using FREON gas R-12 and the physical properties of the nitrile rubber composition.

It is seen that the hydrogen-containing FREON gas-permeabilities of the present compositions in the Examples are equivalent to the hydrogen-free FREON gas-permeability of the NBR composition, and the low-temperature resistance, oil resistance and tensile characteristics of the present composition are also equivalent to those of the NBR composition.

What is claimed is:

1. A thermoplastic elastomer composition having excellent flexibility and balance of oil resistance, low-temperature resistance, and resistance to permeation by fluorocarbons, consisting essentially of;
   (a) 20 to 70 parts by weight of a polyamide, and
   (b) 80 to 30 parts by weight of a butyl rubber modified with from 1 to 50 milliequivalents per 100 grams of said butyl rubber of a member selected from the group consisting of $\alpha,\beta$-ethylenically unsaturated carboxylic acids; $\alpha,\beta$-ethylenically unsaturated carboxylic anhydrides; glycidyl esters of $\alpha,\beta$-ethylenically unsaturated carboxylic acids; and alkenyl glycidyl ethers, the total amount of the (a) and (b) components being 100 parts by weight.

2. The thermoplastic elastomer composition according to claim 1, wherein the polyamide (a) is a member selected from the group consisting of nylon 6, nylon 6,6, nylon 11, nylon 12, nylon 6,9, nylon 6,10, nylon 4,6 and nylon 1,12.

3. The thermoplastic elastomer composition according to claim 1, wherein the polyamide (a) is nylon 11, nylon 12, nylon 6 or nylon 4,6.

4. The thermoplastic elastomer composition according to claim 1, wherein the polyamide (a) is nylon 11 or nylon 12.

5. The thermoplastic elastomer composition according to claim 1, wherein the butyl rubber (b) is that prepared by dehydrohalogenating a halogenated butyl rubber with a dehydrohalogenating agent to prepare a conjugated diene unit-containing butyl rubber and then subjecting the conjugated diene unit-containing butyl rubber to addition reaction in the absence of a peroxide catalyst with a functional group-containing compound selected from the group consisting of $\alpha,\beta$-ethylenically unsaturated carboxylic acids; $\alpha,\beta$-ethylenically unsaturated dicarboxylic anhydrides; glycidyl esters of $\alpha,\beta$-ethylenically unsaturated carboxylic acids; and alkenyl glycidyl ethers.

6. The thermoplastic elastomer composition according to claim 1, wherein the amount of the polyamide (a) is 25 to 60 parts by weight and the amount of the butyl rubber (b) is 75 to 40 parts by weight.

7. The thermoplastic elastomer according to claim 1, wherein the amount of the polyamide (a) is 30 to 55 parts by weight and the amount of the butyl rubber (b) is 70 to 45 parts by weight.

8. A thermoplastic elastomer composition according to claim 1, wherein the $\alpha,\beta$-ethylenically unsaturated carboxylic acids are selected from the group consisting of maleic acid, acrylic acid, methacrylic acid, itaconic acid, monoethyl maleate, fumaric acid, monoethyl fumarate, vinylbenzoic acid, vinylphthalic acid, monoethyl itaconate and maleic monoamilide; the $\alpha,\beta$-ethylenically unsaturated dicarboxylic anhydrides are selected from the group consisting of maleic anhydride, itaconic anhydride, and vinylphthalic anhydride; the glycidyl esters of $\alpha,\beta$-ethylenically unsaturated carboxylic acids are selected from the group consisting of glycidyl methacrylate, glycidyl acrylate, monoglycidyl itaconate and diglycidyl itaconate; and the alkenyl glycidyl ethers are selected from the group consisting of allyl glycidyl ether and vinyl glycidyl ether.

9. A thermoplastic elastomer composition having excellent flexibility and balance of oil resistance, low-temperature resistance, and resistance to permeation by fluorocarbons, consisting essentially of:
   (a) 20 to 70 parts by weight of nylon 11, and
   (b) 80 to 30 parts by weight of a butyl rubber modified with from 1 to 50 milliequivalents per 100 grams of said butyl rubber of a member selected from the group consisting of $\alpha,\beta$-ethylenically unsaturated carboxylic acids; $\alpha,\beta$-ethylenically unsaturated dicarboxylic anhydrides; glycidyl esters of $\alpha,\beta$-ethylenically unsaturated carboxylic acids; and alkenyl glycidyl ethers, the total amount of the (a) and (b) components being 100 parts by weight.

10. A thermoplastic elastomer composition according to claim 9, wherein the $\alpha,\beta$-ethylenically unsaturated carboxylic acids are selected from the group consisting of maleic acid, acrylic acid, methacrylic acid, itaconic acid, monoethyl maleate, fumaric acid, monoethyl fumarate, vinylbenzoic acid, vinylphthalic acid, monoethyl itaconate and maleic monoanilide; the $\alpha,\beta$-ethylenically unsaturated dicarboxylic anhydrides are selected from the group consisting of maleic anhydride, itaconic anhydride, and vinylphthalic anhydride; the glycidyl esters of $\alpha,\beta$-ethylenically unsaturated carboxylic acids are selected from the group consisting of glycidyl methacrylate, glycidyl acrylate, monoglycidyl itaconate and diglycidyl itaconate; and the alkenyl glycidyl ethers are selected from the group consisting of allyl glycidyl ether and vinyl glycidyl ether.

* * * * *